(12) United States Patent
Rovner et al.

(10) Patent No.: US 9,057,634 B2
(45) Date of Patent: Jun. 16, 2015

(54) NOISE DETECTION AND AVOIDANCE

(75) Inventors: Bruce D. Rovner, Minneapolis, MN (US); Scot R. Foss, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 943 days.

(21) Appl. No.: 13/195,348

(22) Filed: Aug. 1, 2011

(65) Prior Publication Data

US 2012/0041704 A1 Feb. 16, 2012

Related U.S. Application Data

(60) Provisional application No. 61/372,637, filed on Aug. 11, 2010.

(51) Int. Cl.
*G01F 1/12* (2006.01)
*G01F 1/72* (2006.01)
*G01F 1/60* (2006.01)

(52) U.S. Cl.
CPC ... *G01F 1/72* (2013.01); *G01F 1/60* (2013.01)

(58) Field of Classification Search
None
See application file for complete search history.

(56) References Cited

U.S. PATENT DOCUMENTS

| | | | |
|---|---|---|---|
| 3,002,383 A | 10/1961 | Mittelmann | 73/194 |
| 3,911,742 A | 10/1975 | Kolin | 73/194 |
| 4,303,980 A | 12/1981 | Yard | 364/510 |
| 6,505,517 B1 | 1/2003 | Eryurek et al. | 73/861.08 |
| 6,594,613 B1 * | 7/2003 | Ley et al. | 702/140 |
| 2006/0235634 A1 * | 10/2006 | Florin | 702/75 |
| 2008/0250867 A1 | 10/2008 | Schmalzried et al. | 73/861.11 |

FOREIGN PATENT DOCUMENTS

| | | |
|---|---|---|
| JP | 60-56221 A | 4/1985 |
| JP | S 60-190814 A | 9/1985 |
| JP | 60-176120 U | 11/1985 |
| JP | 61-155820 A | 7/1986 |
| JP | H03-122523 A | 5/1991 |
| WO | WO 00/34744 | 6/2000 |
| WO | WO 2009/008974 | 1/2009 |

OTHER PUBLICATIONS

Japanese Office Action dated Feb. 4, 2014 for related application Serial No. 2013-524160, 8 pgs including English Translation.
First Office Action dated Jan. 27, 2014 in corresponding Chinese patent application No. 201110229553.0. 21 pages including English Translation.
International Search Report for PCT Application No. PCT/US2011/047024, dated Nov. 29, 2011, 3 pgs.
Written Opinion of the International Search Report for PCT Application No. PCT/US2011/047024, dated Nov. 29, 2011, 7 pgs.
Second Chinese Office Action for Chinese Patent Application No. 201110229553.0, dated Sep. 5, 2014, 20 pages.

* cited by examiner

*Primary Examiner* — Aditya Bhat
(74) *Attorney, Agent, or Firm* — Westman, Champlin & Koehler, P.A.

(57) ABSTRACT

A process variable transmitter includes a sensor drive controller that outputs a sensor drive signal that is used to drive a sensor that senses a process variable. The sensor drive controller changes the frequency of the sensor drive signal to avoid frequencies and associated harmonics at which noise occurs and which could interfere with the sensor signal.

22 Claims, 5 Drawing Sheets

NOISE DETECTION AND AVOIDANCE

CROSS-REFERENCE TO RELATED APPLICATION

The present application is based on and claims the benefit of U.S. provisional patent application Ser. No. 61/372,637, filed Aug. 11, 2010, the content of which is hereby incorporated by reference in its entirety.

BACKGROUND OF THE INVENTION

The present invention relates to process variable transmitters used in process control and monitoring systems. More specifically, the present invention relates to detecting process noise frequency and adjusting sensor control signals so the sensor control signal frequency is moved away from the detected noise frequency to avoid error induced by the process noise.

Process variable transmitters are used to measure process parameters in a process control or monitoring system. Microprocessor-based transmitters often include a sensor, an analog-to-digital converter for converting an output from the sensor into a digital form, a microprocessor for compensating the digitized output, and an output circuit for transmitting the compensated output. Currently, this transmission is normally done over a process control loop, such as a 4-20 mA control loop, or wirelessly.

One exemplary parameter that is measured by such a system is the volumetric flow rate of a conductive fluid through a tube or pipe in the process. This can be done, for example, using a magnetic flow meter.

One exemplary type of magnetic flow meter includes a pipe, with coils disposed on opposite sides of a cross section of the pipe. The coils are energized by a coil drive current from a transmitter and develop a magnetic field along the cross section of the pipe. Two electrodes are located across the pipe from each other along a line which is perpendicular to the magnetic field. Fluid passing through the pipe is electrically conductive. As a result of the movement of the conductive fluid through the magnetic field, an electric potential or electromotive force (EMF) is induced in the fluid which is detected by the electrodes.

These types of magnetic flow meters are often deployed in processes that have various substances added to the flow of fluid through the pipe, that is being sensed and measured. For instance, in some paper processing mills, silica is added to the fluid flowing through the pipe in the paper process. The silica can be added to the process using a piston pump that is controlled by a variable frequency drive motor to control the flow of the silica added to the process.

Piston pumps normally operate using a set of pistons that are alternatively connected to an input port and an output port. The substance to be pumped is alternately drawn in through the inlet port and then pumped out through the outlet port by the reciprocating action of the piston. When this type of pump is used to add a substance to fluid flowing through a pipe in a process, the pump can add a pressure modulation to the flow that corresponds to the speed of operation of the pump. This pressure modulation can be observed by the magnetic flow meter and can contain significant energy at the odd harmonics of the coil drive frequency used to drive the coils in the magnetic flow meter. This can result in a beat frequency to appear on the measured output signal that measures the process flow.

Of course, this type of introduction of periodic noise caused by a piston pump (which interferes with the measurement of flow) is but one exemplary source of periodic or intermittent noise that can interfere with the measured output signals that represent measured process variables. A variety of other noise sources can create noise that interferes with the measurement of process variables in a similar way. For instance, similar types of noise can be generated by sources that cause pulsating pressure, vibration, and external electrical interference, to name a few.

SUMMARY

A process variable transmitter includes a sensor drive controller that outputs a sensor drive signal that is used to drive a sensor that senses a process variable. The sensor drive controller changes the frequency of the sensor drive signal to avoid frequencies and associated harmonics at which noise occurs and which could interfere with the sensor signal.

DETAILED DESCRIPTION

Figure 1:
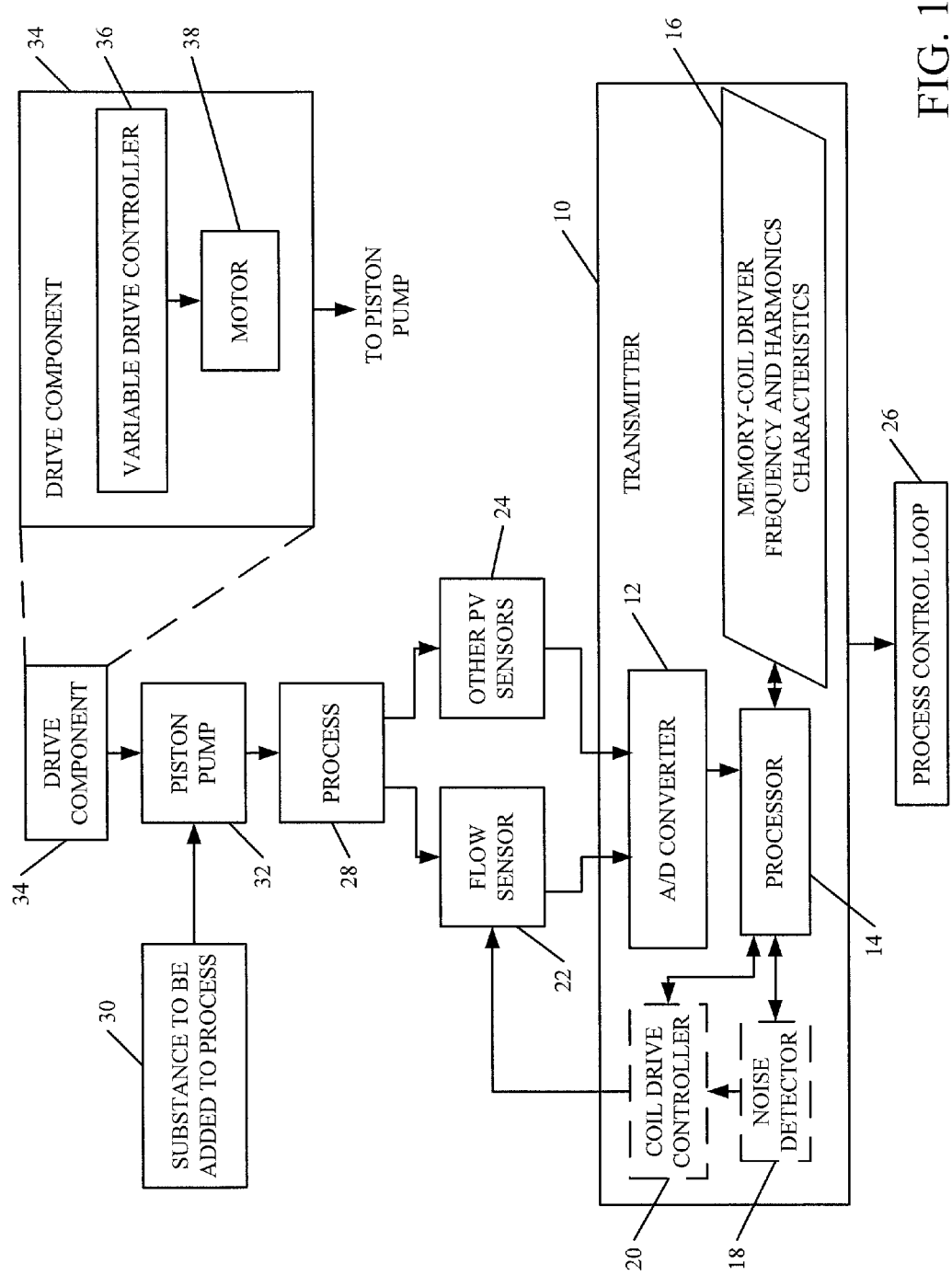
FIG. 1 is a simplified block diagram of a process variable transmitter coupled to a sensor and a process.

FIG. 1 is a simplified block diagram of a transmitter 10 in accordance with one embodiment. Transmitter 10, in the embodiment shown in FIG. 1, includes analog-to-digital (A/D) converter 12, processor 14, memory 16, noise detector 18 and coil drive controller 20. Transmitter 10 is shown coupled to flow sensor 22 and zero or more other process variable (PV) sensors 24. Transmitter 10 is also shown coupled to process control loop 26. Of course, transmitter 10 could be connected to a wireless transmission connection instead, or in addition to process control loop 26. In one embodiment, process control loop 26 provides power to transmitter 10. Processor 14 transmits information over process control loop 26 and receives information from other circuits or systems, over process control loop 26 as well. By way of example, process control loop 26 may illustratively be a 4-20 mA process control loop and may operate using a suitable communication protocol. Other example formats include Modbus, Profibus or Fieldbus. Alternatively, process control loop 26 can be replaced by, or used in addition to, a wireless connection, transmitting the information wirelessly employing various wireless techniques or configurations.

Sensors 22 and 24 are illustratively process variable sensors that receive inputs from process 28 that is being sensed. Sensor 22 is illustratively a flow sensor for sensing flow in process 28, and other PV sensors 24 can be a variety of other sensors, such as sensors that sense pressure, temperature, PH, etc. Sensors 22 and 24 illustratively provide an analog output to A/D converter 12 indicative of the sensed parameter.

Sensors 22 and 24 can be sensors that are driven by various sensor drive signals at different frequencies. Embodiments discussed herein are directed to detecting noise in the signal output by sensor 22 and the signals output by PV sensors 24 and to change the frequency of the sensor drive signals used to drive the sensors so that the frequency of the noise in the process does not interfere with the measurements of the sensor signals provided to transmitter 10. The present specification will describe this in terms of controlling the frequency of a coil drive signal output by coil drive controller 20 to drive coils on flow sensor 22. The coil drive frequency is changed such that noise generated, at certain frequencies, by process 28 does not interfere with the sensor signal output by flow sensor 22. It will be recognized, of course, that the frequency of other sensor drive signals used to drive other sensors 24 can be controlled in this way as well, in order to increase the accuracy of the sensor signal output by those sensors and measured by transmitter 10.

The present discussion will proceed with respect to an exemplary embodiment in which noise is induced in the system by the reciprocation of a piston pump. This is illustrative only, and the same steps can be applied to detect and avoid other sources of noise as well. That being said, FIG. 1 illustrates that process 28 illustratively has a substance 30 that is added to it by piston pump 32. For instance, where process 28 is used for processing paper, the substance 30 to be added to process 28 may illustratively be silica. Of course, a wide variety of different processes can be represented by process 28. In the specific embodiment shown in FIG. 1, piston pump 32 is driven by drive component 34. For instance, drive component 34 may include variable drive controller 36 that drives motor 38, which ultimately drives piston pump 32 to pump substance 30 into process 28.

Coil drive controller 20 and noise detector 18 are shown in phantom in FIG. 1 to indicate that they can be separate components, or incorporated within, processor 14. In the embodiment described herein, processor 14 is a computer microprocessor that has associated memory and clock circuitry and provides information regarding the sensed parameters over process control loop 26. It should be noted, of course, that processor 14 can include an input/output (I/O) circuit, or an I/0 circuit can be provided separately, that transmits information in a digital formant on loop 26, or in an analog format by controlling current flow through loop 26. In any case, the information related to the sensed parameters is provided over process control loop 26 by transmitter 10.

Figure 2:
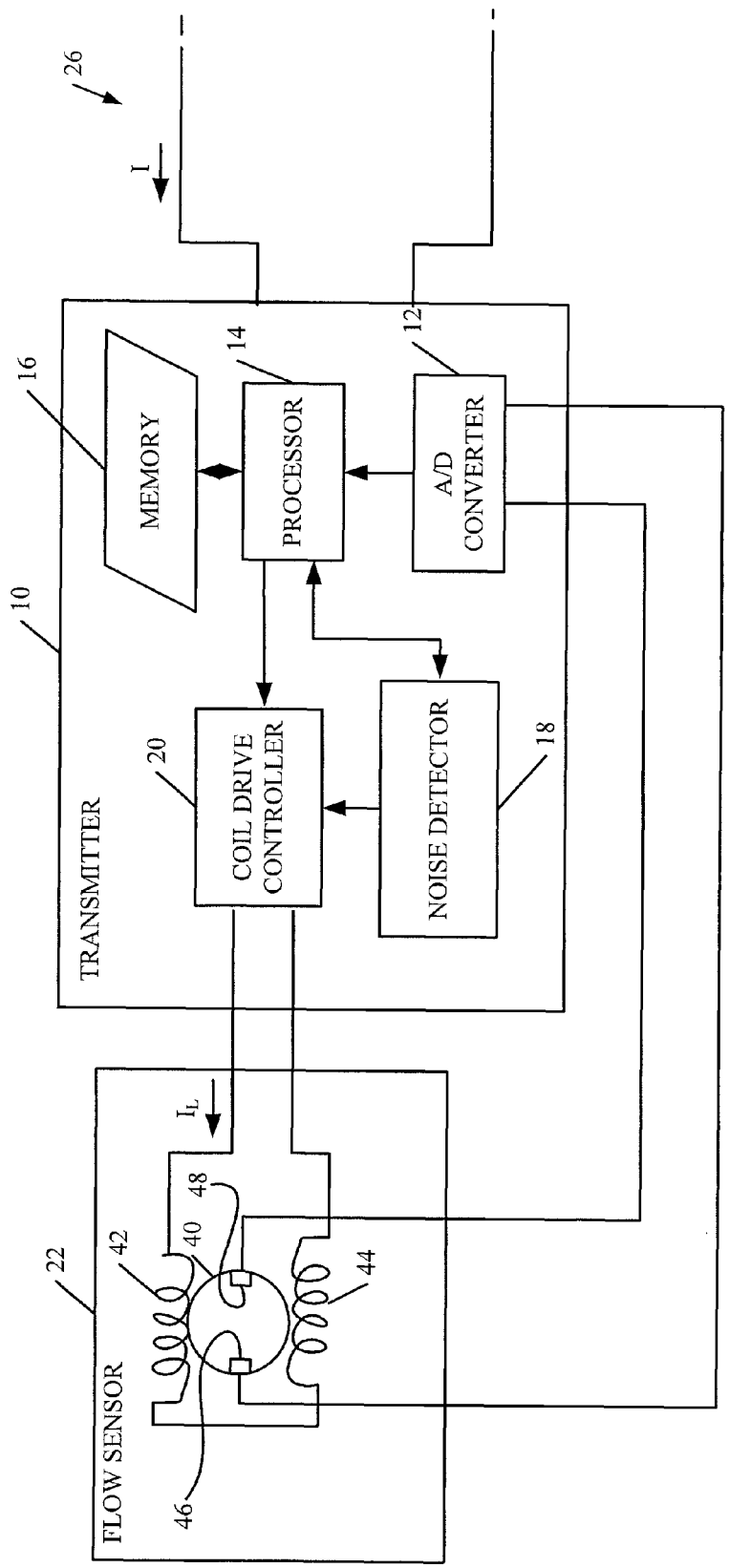
FIG. 2 is a simplified partial schematic and partial block diagram of one embodiment of a magnetic flow meter.

As discussed above, by way of example only, flow sensor 22 in FIG. 1 will be described as a magnetic flow meter that senses the flow of conductive fluid through a pipe in process 28. FIG. 2 is a partial schematic, partial block diagram of transmitter 10 coupled to a magnetic flow meter which comprises flow sensor 22. FIG. 2 shows that transmitter 10 connects to a two-wire, 4-20 mA communication loop that carriers current I and an A/C power line (not shown). Flow sensor 22 includes flow tube 40, a pair of coils 42 and 44 and a pair of electrodes 46 and 48. Transmitter 10 provides a load current $I_L$ to drive coils 42 and 44 adjacent flow tube 40. This generates a magnetic field in fluid flowing through tube 40. Electrodes 46 and 48 are mounted in flow tube 40 along a line generally perpendicular to the magnetic field in the fluid for sensing EMF induced in the fluid flow. Transmitter 10 senses the EMF between electrodes 46 and 48 and controls an output current I representative of the sensed EMF which is, in turn, proportional to fluid flow in tube 40. Transmitter 10 can transmit this information using a variety of different analog or digital communication formats.

Coil drive controller 20, in one embodiment, includes a transistor bridge circuit that controls a constant current drive that generates alternating load current $I_L$ through coils 42 and 44. Processor 14 controls coil drive controller 20 such that load current $I_L$ begins flowing in one direction through coils 42 and 44 and is then turned on and off at a given frequency referred to herein as the coil drive frequency. Drive controller 20 is then controlled by processor 14 to reverse the flow of load current $I_L$ such that it is flowing in the opposite direction through coils 42 and 44 and is then turned on and off at the coil drive frequency. The current flowing through coils 42 and 44 generates a magnetic field in the fluid flowing in tube 40 and movement of the conductive fluid through tube 40 induces an EMF in the fluid flow which is sensed by electrodes 46 and 48. A/D converter 12 converts the analog signals provided by electrodes 46 and 48 into digital values which are provided to processor 14 for measurement. Processor 14 provides an output current I representative of the sensed EMF which is, in turn, proportional to fluid flow in tube 40.

With reference again to FIG. 1, the reciprocation of pistons in piston pump 32 (in order to add substance 30 to process 28) can add a pressure modulation to the flow of fluid through pipe 40. The pressure modulation corresponds to the speed of pump 32. This pressure modulation can be observed on the signals provided by electrodes 46 and 48 and those signals can contain significant energy at the primary frequency and the odd harmonics of the coil drive frequency used to drive coils 42 and 44. This can cause a beat frequency to appear on the signal output by flow sensor 22 and that beat frequency can thus be incorporated into the output provided by processor 14 over process control loop 26. Thus, the pressure modulation introduced by pump 32 can be a source of error in the flow signal that represents the sensed flow of fluid through pipe 40.

In order to avoid this error, in one embodiment, processor 14 first controls flow sensor 22 in order to identify the frequency characteristics of the coil drive signal used by coil drive controller 22 to drive coils 42 and 44. Processor 14 then uses those characteristics to detect noise frequencies that are close enough to the coil drive frequency in order to cause inaccuracies in the measurement. Processor 14 then controls coil drive controller 20 to drive coils 42 and 44 at a frequency that is sufficiently distant from the noise frequencies detected, so that the noise frequencies will not introduce error into the measured output signal.

Figure 3:
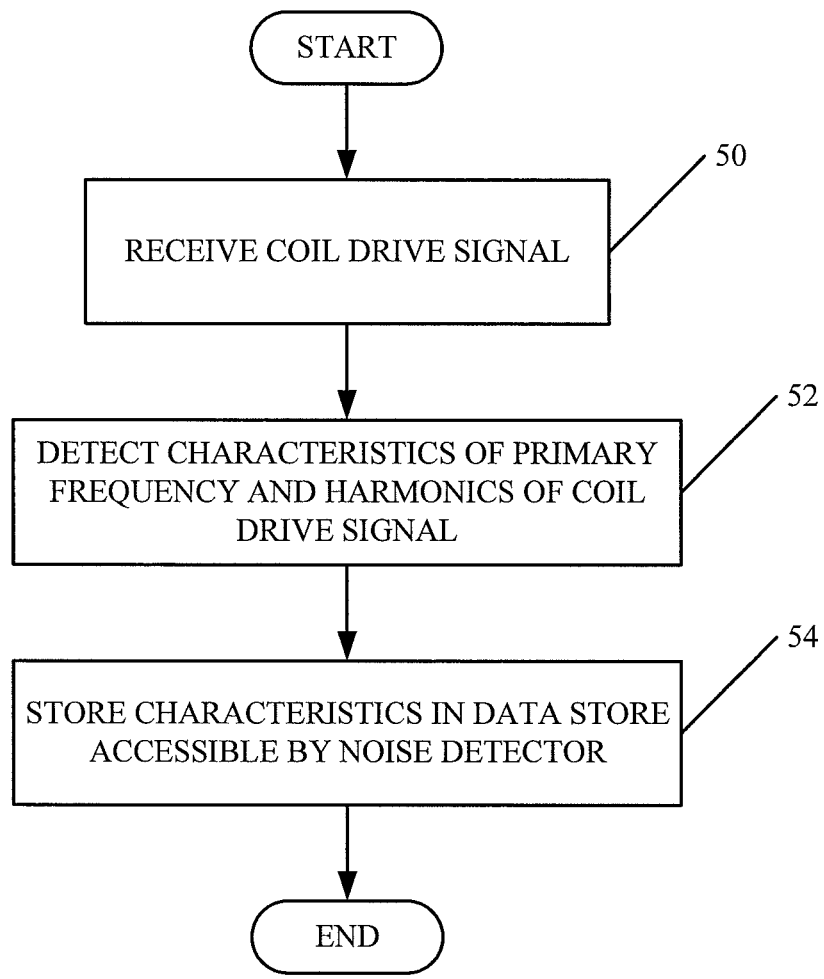
FIG. 3 is a flow diagram illustrating the operation of the system shown in FIG. 1 in characterizing a sensor drive signal.

FIG. 3 is a flow diagram of one illustrative embodiment of the operation of transmitter 10 in order to first identify the frequency characteristics of the coil drive signal. In the embodiment shown in FIG. 3, processor 14 receives the coil drive signal (or some representative signal indicating the frequency of the coil drive signal). This is indicated by block 50 in FIG. 3.

Processor 14 then detects characteristics of the primary frequencies and harmonics of the coil drive signal. This is indicated by block 52. In one embodiment, detector 14 detects the ratio of the primary frequency to the harmonics and stores that in memory 16. In the embodiment shown in FIG. 1, memory 16 is a non-volatile memory in transmitter 10. Storing the characteristics of the primary frequency and harmonics of the coil drive signal is indicated by block 54 in FIG. 3.

Figure 4:
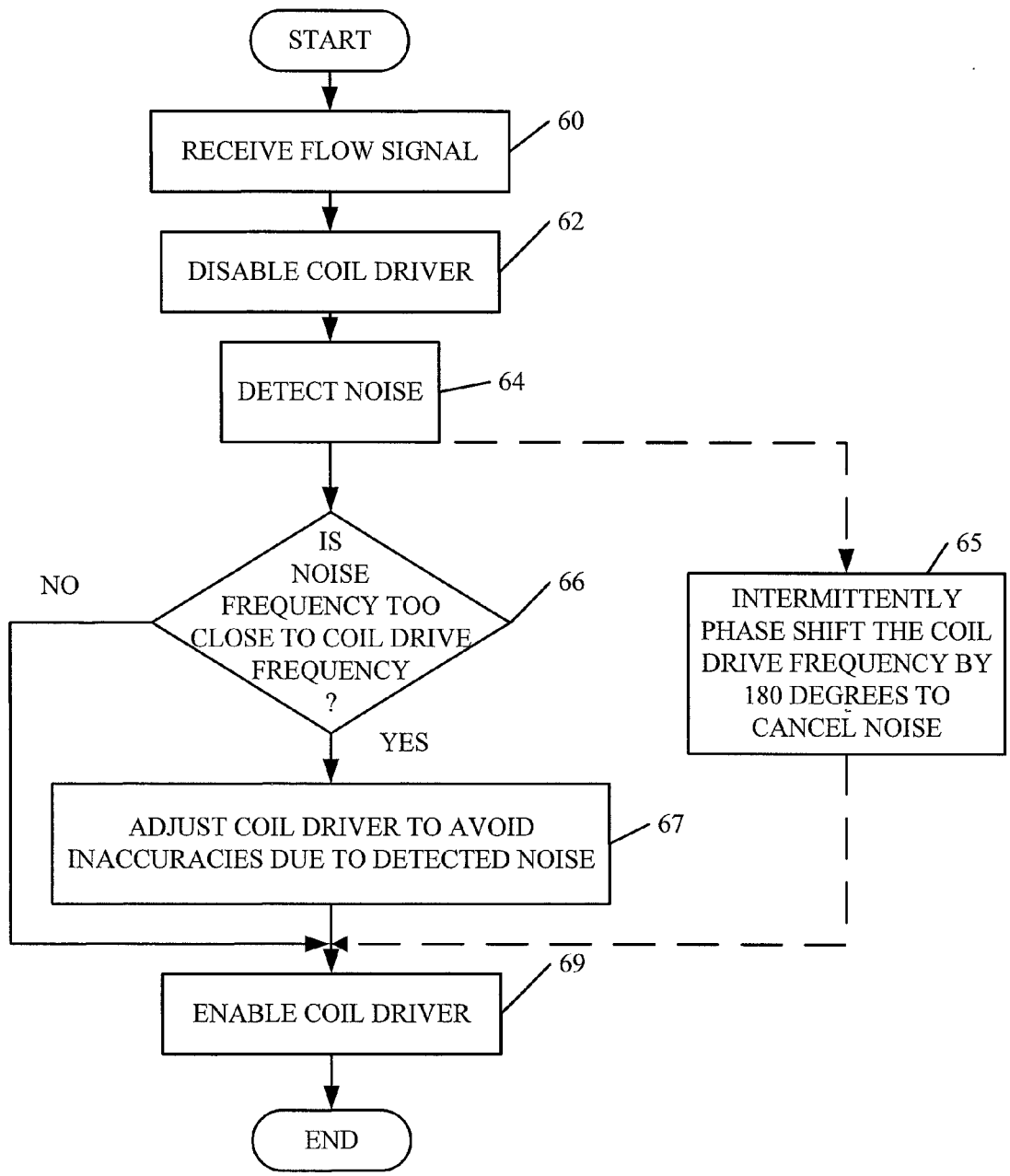
FIG. 4 is a flow diagram illustrating one embodiment of the operation of the system shown in FIG. 1 for detecting noise.

Once the characteristics of the coil drive frequency have been detected and stored, processor 14 can use noise detector 18 to detect noise in the flow signal provided by flow sensor 22. FIG. 4 is a flow diagram illustrating one embodiment of the operation of transmitter 10 in detecting noise. Once the characteristics of the coil drive signal have been identified and stored, processor 14 can detect the noise as the improper harmonic content in the electrode signals provided by electrodes 46 and 48 to transmitter 10. Processor 14 can then do one of a number of different things, in accordance with various embodiments. In one embodiment, processor 14 intermittently (e.g., periodically) phase shifts the coil drive frequency by 180 degrees. This effectively cancels the noise. This is indicated by block 65 in FIG. 4. The periodic phase shift basically converts the low frequency noise caused by the pump beating to high frequency noise. The high frequency noise can be more easily filtered with an RC filter. In one embodiment, where the coil drive frequency was periodically phase shifted, a two second clamping RC filter is used. It has been seen that peak-to-peak noise was 14 times less than on a measurement taken on a signal where the coil frequency was not phase shifted.

In another embodiment, processor 14 monitors the electrode frequency spectrum to detect when noise approaches the coil drive primary frequency or odd harmonics and then changes the coil drive frequency so that it is sufficiently distant from the noise frequency to avoid errors.

In doing so, processor 14 first receives the flow signal from electrodes 46 and 48. This is indicated by block 60 in FIG. 4. Processor 14 then controls drive controller 20 to momentarily disable coil drive controller 20 in order to detect noise that is caused by sources other than flow of the fluid through tube 40. Other such sources include pulsating pressure, vibration, external electrical interference, etc. It will be noted, of course, that in this step, processor 14 will detect noise introduced by the pressure modulation of piston pump 32. Disabling the coil drive and detecting noise are indicated by blocks 62 and 64 in FIG. 4, respectively.

Processor 14 then determines whether the noise frequency detected in block 64 is too close to the coil drive frequency, or its harmonics, such that it may cause an undesirable amount of noise. In doing so, processor 14 accesses the coil drive frequency and harmonics characteristics stored in memory 16 and compares them to the detected noise frequency. Determining whether the noise frequency is too close to the coil drive frequency or its harmonics is indicated by block 66 in FIG. 4. Exactly how close the two frequencies can be before substantial interference occurs will depend on the particular application. It can be determined ahead of time, or at runtime, and it can be determined empirically as well.

If the noise frequency is not too close to the coil drive frequency or its harmonics, processor 14 need not change the coil drive frequency and simply enables the coil driver as indicated by block 69. However, if the two are too close, then processor 14 adjusts coil drive controller 20 to change the coil drive frequency to avoid inaccuracies due to the detected noise. This is indicated by block 67 in FIG. 4. In one embodiment, adjusting the coil drive frequency is simply done by changing the frequency so that it is far enough away and avoids harmonics from the pulsating noise in order to keep the noise from interfering with the measurement of the process variable being sensed.

While FIG. 4 shows one embodiment for detecting noise that can be avoided, other embodiments can be used as well. For instance, instead of simply momentarily disabling the coil driver at block 62, the noise detection can be part of a user-commanded test. In that embodiment, the user can simply request that noise be detected, and processor 14 can disable the coil driver for a longer period of time, during which noise can be detected, and noise sources can optionally be identified. Of course, other variations can be used as well, in detecting noise.

Figure 5:
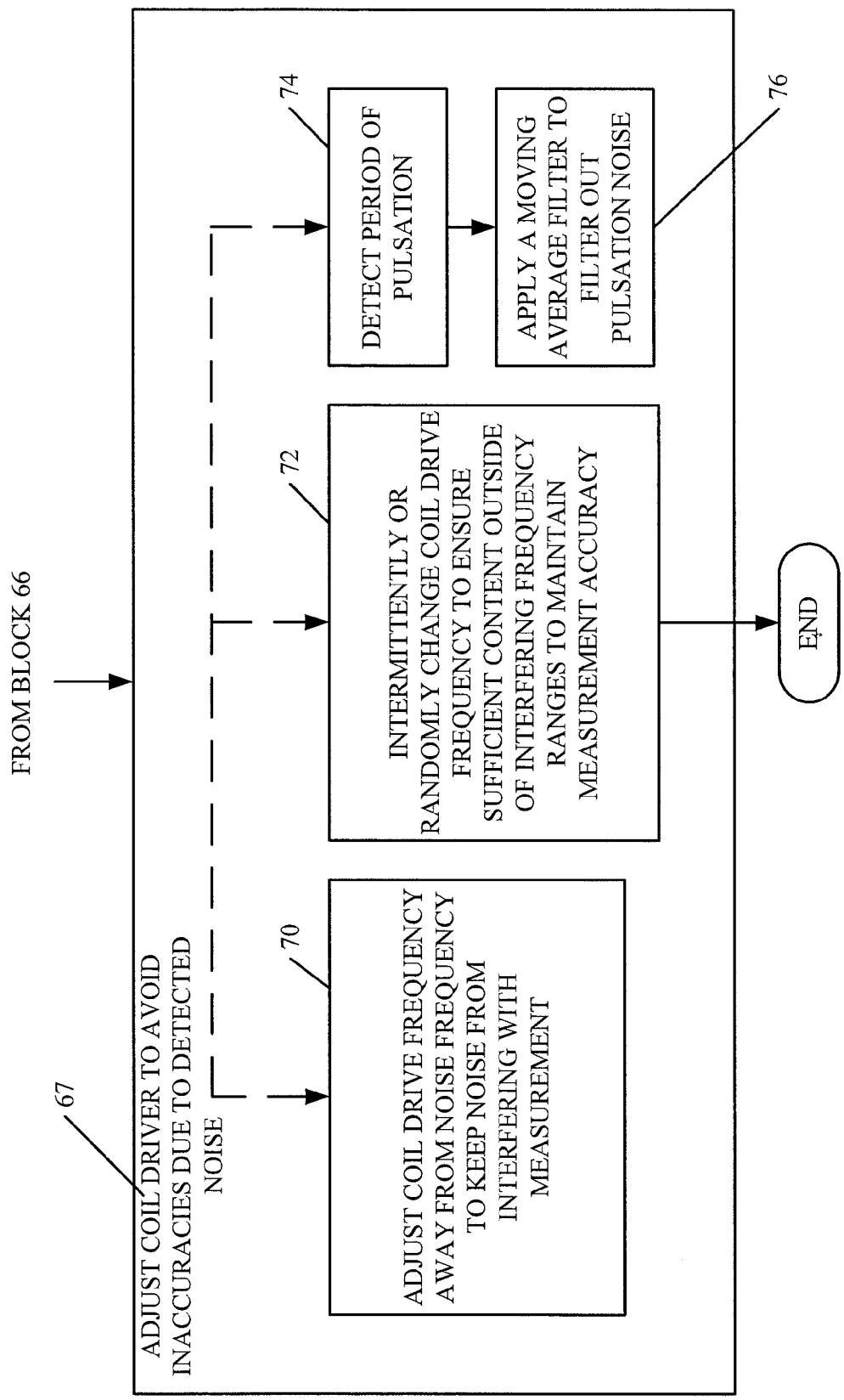
FIG. 5 is a flow diagram illustrating one embodiment of the operation of the system shown in FIG. 1 for modifying a sensor drive signal to avoid noise frequencies.

FIG. 5 is a flow diagram that illustrates a number of different embodiments for adjusting the coil drive to avoid inaccuracies due to detected noise, shown in block 67 in FIG. 4. In one embodiment shown in FIG. 5, processor 14 simply adjusts the coil drive frequency (by controlling coil drive controller 20) so that it and its harmonics are far enough away from the noise frequency to keep noise from interfering with the measurement being taken. This is indicated by block 70 in FIG. 5.

In another embodiment shown in FIG. 5, processor 14 can control coil drive controller 20 so that it intermittently or randomly changes the coil drive frequency within a range of operable frequencies. By changing the coil drive frequency often enough, processor 14 ensures that the coil drive frequency has sufficient content outside of the interfering frequency ranges to maintain measurement accuracy. That is, if the period where the coil drive frequency is sufficiently far away from the noise frequency to avoid noise interference is great enough, then even though the coil drive frequency may intermittently be too close to the noise frequency for a short period of time, the noise will still not interfere with the measured signal in any significant way. Randomly or intermittently changing the coil drive frequency in this way is indicated by block 72 in FIG. 5.

Another embodiment for avoiding the interference caused by periodic noise is to detect the period of pulsation (or the period of the noise interference) and then filter it out. For instance, in FIG. 5, detector 14 can use noise detector 18 to detect the period of pulsation caused by piston pump 32, or the period of any other interfering noise. This is indicated by block 74. Having detected the period of interfering noise, processor 14 can then simply apply a moving average filter to filter out the pulsation (or otherwise interfering) noise. This is indicated by block 76. Of course, other ways for adjusting the coil driver to avoid inaccuracies due to detected noise can be used as well.

It will be appreciated that, while the present description proceeded primarily with respect to noise introduced into the flow signal by a piston pump, the same techniques can be used to avoid noise in substantially any other process variable which is sensed by a sensor that has a driver that drives the sensor at a given frequency, and which suffers from interfering noise that interferes at frequencies that can be detected. Thus, the present description is not to be limited to only avoiding periodic noise associated with a flow sensor.

Although the present invention has been described with reference to preferred embodiments, workers skilled in the art will recognize that changes may be made in form and detail without departing from the spirit and scope of the invention.

What is claimed is:

1. A method of using a process variable transmitter to control a process variable sensor that senses a process variable in a running process, the method comprising:
   applying a sensor control signal to the process variable sensor;
   receiving a sensor signal from the process variable sensor related to the process variable, the sensor control signal, and noise in the process;
   retrieving frequency characteristics of the sensor control signal from a memory, the frequency characteristics of the sensor indicative of a primary drive frequency and harmonics of the sensor control signal;
   detecting noise in the sensor signal based upon the retrieved frequency characteristics;
   adjusting a sensor control signal frequency of the sensor control signal to reduce an effect of the noise in the process; and
   controlling the process variable sensor at the adjusted sensor control signal frequency.

2. The method of claim 1 wherein adjusting the sensor control signal frequency comprises:
   periodically shifting a phase of the sensor control signal frequency to cancel the noise.

3. The method of claim 2 wherein periodically shifting comprises:
periodically shifting the phase of the sensor control signal by 180 degrees.

4. The method of claim 1 and further comprising:
detecting a noise frequency at which noise occurs on the sensor signal; and
wherein adjusting the sensor control signal frequency comprises adjusting the sensor control signal frequency based on the detected noise frequency.

5. The method of claim 4 and further comprising:
prior to detecting the noise frequency, detecting frequency characteristics of the sensor control signal; and
storing the frequency characteristics.

6. The method of claim 5 and further comprising:
after detecting the noise frequency, comparing the noise frequency to the frequency characteristics of the sensor control signal.

7. The method of claim 6 and further comprising:
adjusting the sensor control signal frequency if the noise frequency is sufficiently close to the frequency characteristics of the sensor control signal.

8. The method of claim 7 wherein adjusting the sensor control signal frequency comprises:
adjusting the sensor control signal frequency so that it is sufficiently far away from the noise frequency to avoid substantial interference with the sensor signal.

9. The method of claim 7 wherein adjusting the sensor control signal frequency comprises:
randomly changing the sensor control signal frequency within a desired range of frequencies.

10. The method of claim 7 wherein adjusting the sensor control signal frequency comprises:
detecting a period of the noise frequency; and
applying a filter to the sensor control signal to filter components of the sensor control signal to filter out periodic noise occurring at the period of the noise frequency.

11. The method of claim 4 and further comprising:
prior to detecting the noise frequency, intermittently disabling the sensor control signal and then detecting the noise frequency.

12. The method of claim 4 and further comprising:
prior to detecting the noise frequency, disabling the sensor control signal in response to a user request and then detecting the noise frequency in response to a user request to detect the noise frequency.

13. The method of claim 1 wherein detecting noise is based upon a harmonic content of the sensor signal.

14. A process variable transmitter receiving a sensor signal from a process variable sensor and controlling the sensor using a control signal, the transmitter comprising:
a memory containing a stored frequency characteristic of the sensor control signal indicative of a primary drive frequency and harmonics of the sensor control signal;
a noise detector detecting noise, having a noise frequency, on the sensor signal based upon the stored frequency characteristics;
a controller generating the control signal at a control frequency; and
a processor, coupled to the noise detector and the controller, configured to adjust the control frequency based on the noise frequency.

15. The process variable transmitter of claim 14 and further comprising:
a frequency characteristics data store, the processor identifying frequency characteristics of the control signal and storing the frequency characteristics in the frequency characteristics data store.

16. The process variable transmitter of claim 15 wherein the processor identifies the frequency characteristics of the control signal as a ratio of the control frequency to harmonics of the control frequency.

17. The process variable transmitter of claim 14 wherein the processor adjusts the control frequency by randomly changing the control frequency within a desired range of frequencies.

18. The process variable transmitter of claim 14 wherein the processor periodically phase shifts the control frequency by 180 degrees.

19. The process variable transmitter of claim 14 wherein detecting noise is based upon a harmonic content of the sensor signal.

20. A process variable transmitter receiving a flow signal, from a magnetic flow meter, indicative of flow of a process fluid through a conduit, the process variable transmitter comprising:
a coil drive controller generating a coil drive signal to drive coils on the magnetic flow meter at a coil drive frequency;
a noise detector detecting periodic noise, having a noise frequency, on the flow signal; and
a processor configured to intermittently disable the coil drive signal so the noise detector can detect the periodic noise, compare the noise frequency to stored frequency characteristics of the coil drive signal indicative of a primary drive frequency and harmonics of the coil drive signal, and adjusting the coil drive frequency, based on the comparison, to thereby avoid substantial interference of the periodic noise with the flow signal.

21. The process variable transmitter of claim 20 and further comprising:
a frequency data store, wherein the processor identifies the frequency characteristics of the coil drive signal and stores them in the frequency data store.

22. The process variable transmitter of claim 20 wherein the process variable transmitter receives additional sensor signals from additional sensors indicative of other sensed process variables, wherein the noise detector detects periodic noise, at a noise frequency, on the additional sensor signals and wherein the processor adjusts sensor control signals, for controlling the additional sensor signals, based on a comparison of frequency characteristics of sensor control signals for the additional sensors and the noise frequency of the periodic noise detected on the additional sensor signals.

* * * * *